United States Patent Office 3,436,391
Patented Apr. 1, 1969

3,436,391
DIHYDROANTHRACENE COMPOUNDS
Torkil Holm, Copenhagen, Denmark, assignor to Kefalas A/S, Copenhagen-Valby, Denmark
No Drawing. Filed Jan. 17, 1963, Ser. No. 252,063
Claims priority, application Great Britain, Jan. 26, 1962, 3,176/62
The portion of the term of the patent subsequent to Sept. 15, 1981, has been disclaimed
Int. Cl. C07d *51/70;* C07c *87/24;* A61k *27/00*
U.S. Cl. 260—240      16 Claims The present invention relates to the production of compounds of the general structural formula:

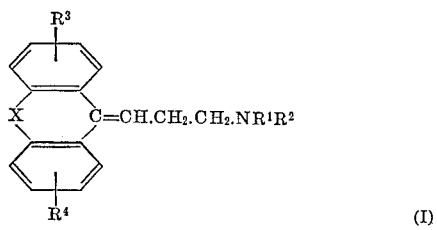

(I)

wherein X designates —$CH_2$—$CH_2$—, —CH=CH— or —$C(CH_3)_2$—, ·$NR^1R^2$ designates a mono-(lower-alkyl) amino group, a di-(lower-alkyl)amino group, or the radical of a saturated five-membered or six-membered heterocyclic amine, and $R^3$ and $R^4$ each designates hydrogen, halogen, a lower-alkyl group or a lower-alkyloxy group, as well as acid addition salts thereof.

The compounds of Formula I wherein X designates —$C(CH_3)_2$— and —$NR^1R^2$ designates a mono-(lower alkyl)amino group or a piperazine or an N'-hydroxy-lower-alkylpiperazine radical are previously unknown compounds and these compounds per se are within the scope of the present invention.

The compounds of Formula I and the acid addition salts thereof are useful therapeutics and possess valuable pharmacodynamic properties, which make them particularly useful as anti-depressants in the treatment of psychotic patients. Thus it has been shown that the compounds of Formula I distinguish themselves in the treatment of patients suffering from depressions, especially of an endogenic nature.

When the compounds of Formula I are asymmetrically substituted in the phenyl rings, they may exist as two geometric isomers of the cis-trans type, which isomers although similar are not identical with respect to their pharmaco-dynamic properties. The isomers may be separated according to procedure conventional in the art.

The compounds of Formula I and the acid addition salts thereof may be administered both orally and parenterally, for example in the form of tablets, capsules, powders, syrups or solutions for injection.

The invention moreover relates to a particular method for the preparation of compounds of Formula I, whereby a quaternary ammonium compound of the general formula:

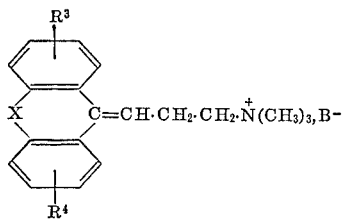

wherein X, $R^3$ and $R^4$ are as defined above and B⁻ represents an inorganic anion such as I⁻, Br⁻, Cl⁻, ½SO₄⁻⁻, or the like, is reacted with an amine of the formula $HNR^1R^2$, wherein ·$NR^1R^2$ is as defined above, whereupon the resulting compound of the Formula I may be isolated as the free base or in the form of an acid addition salt and, in the event said thus-produced compound of Formula I or acid addition salt is a mixture of geometric isomers, the individual isomers thereof may be isolated, if desired, by procedure already known for the separation and isolation of such isomers.

In the foregoing Formula I and elsewhere herein the terms lower-alkyl and lower-alkyloxy refer to alkyl or alkyloxy radicals containing up to and including eight carbon atoms, and preferably no more than three carbon atoms, which may have either straight or branched chain structure, for example methyl, ethyl, propyl, isopropyl, butyl, isobutyl, amyl, hexyl, heptyl, octyl, methoxy, ethoxy, propoxy, butoxy, amyloxy, hexoxy, heptoxy, or the like.

As representative examples of radicals in which $R^1$ and $R^2$ together with the nitrogen atom in Formula I represent a saturated five-membered or six-membered heterocyclic amine radical may be mentioned the pyrrolidine, piperidine, morpholine, thiamorpholine, piperazine, N'-lower-alkylpiperazine, N' - hydroxy-lower-alkylpiperazine, C-methyl derivatives of the foregoing, and like radicals. The N'-hydroxy-lower-alkylpiperazine radicals may be represented by the partial formula: >N-lower-alkylene-OH, wherein the lower-alkylene radical is straight or branched and is a lower-alkyl radical minus one hydrogen atom and the hydroxy group may be primary, secondary or tertiary.

The method of the invention distinguishes itself therein that it makes possible the preparation of valuable compounds of Formula I, which are not accessible by known methods for the preparation of compounds of similar structure.

In carrying out the method of the invention, it is preferred to employ a considerable excess of the amine reactant of the formula $HNR^1R^2$ and in some cases it is convenient to utilize this amine reactant in a sufficient quantity to serve as solvent for the reaction. However, other inert solvents, such as ethanol, benzene, toluene, or the like, may be employed with equal facility.

The reactants are conveniently mixed together and their reaction assisted by the application of external heat in order to assure a reasonable time of reaction and satisfactory conversions. Advantageously, the temperature is at least 100 degrees centigrade and often higher. For the same reason, and especially where the amine reactant is quite volatile, the reaction may be conducted under pressure as in an autoclave.

The time allowed for reaction may be varied considerably but, like temperature and other factors, will have a substantial effect upon conversions and yields. Reaction periods of from twenty to forty-eight hours have been found entirely satisfactory with shorter and longer periods being utilizable respectively resulting in somewhat lesser success as to conversions and yields and no appreciable improvement therein over those experienced using shorter reaction periods.

It has proved especially advantageous to add a little water to the reaction mixture or to employ an amine of the formula $HNR^1R^2$ which is not anhydrous. This may in some cases result in considerably improved yields and purity of the end products.

When the compounds of Formula I are asymmetrically substituted in the ring system, they may be obtained from the reaction as a mixture of their cis and trans-isomers. It is convenient to separate such mixtures into their individual isomers since, as already stated, these have often been found to differ with respect to their pharmacodynamic effects. The separation of the isomers is conveniently carried out by a fractional crystallization which in respect of the compounds of Formula I may be carried out on the free base and on acid addition salts thereof as well, it usually being possible to find a solvent in which the solubilities of the isomers differ to a suitable extent.

For obvious reasons, when isolating any of the compounds of Formula I in the form of an acid addition salt, the acid is preferably selected so as to contain an anion which is non-toxic and pharmacologically acceptable, at least in usual therapeutic doses. Representative acid addition salts are hydrochlorides, hydrobromides, sulphates, phosphates, nitrates, acetates, lactates, maleates, citrates, tartrates and bitartrates, succinates, oxalates, methanesulphonates and ethanesulphonates. Other acid addition salts are likewise suitable and may be employed if desired. For example, fumaric, benzoic, salicylic, bismethylenesalicylic, propionic, gluconic, malic, malonic, mandelic, cinnamic, citraconic, stearic, palmitic, itaconic, glycolic, benzene-sulphonic, and sulphonic acids may also be employed as acid addition salt-forming acids. While it is preferred to isolate the products from the process of the invention in the form of a solid or crystalline acid addition salt, if for any reason it is desired to obtain one of these amines in the form of its free base, this is ordinarily done according to conventional procedure, for example by conducting the amine exchange reaction in a solvent and thereafter evaporating solvent to obtain the reaction product as a residue, usually an oil, or by dissolving the isolated hydrochloride or other salt in water, treating with a base such as ammonia, ammonium hydroxide, sodium carbonate or other suitable alkaline material, extracting the liberated base with a suitable solvent such as benzene, drying the extract, and evaporating to dryness in vacuo or fractionally distilling.

The following examples are given by way of illustration only and are not to be construed as limiting.

Example 1.—9-gamma-methylaminopropylidene-10,10-dimethyl-9,10-dihydroanthracene and its hydrochloride 150 grams of the methiodide of 9-gamma-dimethylaminopropylidene-10,10-dimethyl - 9,10 - dihydroanthracene, melting at 167–171 degrees centigrade, prepared by quarternizing 9-gamma-dimethylaminopropylidene-10,10-dimethyl-9,10-dihydroanthracene with excess methyliodide in ethanol are dissolved in 200 milliliters of liquid methylamine and ten milliliters of water and the mixture heated for sixteen hours at 140 degrees centigrade in an autoclave. Thereafter fifty milliliters of 25% sodium hydroxide solution are added, and the mixture is heated on a steam bath with stirring until complete evaporation of excess methylamine. The residue is dissolved in 600 milliliters of ether, and 1 N hydrochloric acid is added with agitation in a separatory funnel to a pH of 4–5. The aqueous layer is separated and excess of aqueous sodium hydroxide is added, whereupon the mixture is extracted with ether in a separatory funnel. The ether phase is separated, dried over potassium carbonate and evaporated to dryness on a steam bath. The residue is dissolved in 100 milliliters of acetone and the solution neutralized by dropwise addition of a solution of hydrogen chloride in ether. After cooling and standing for some time crystals separate out which are filtered off, washed with a little acetone and dried. After recrystallization from ethanol 60 grams of the hydrochloride of 9-gamma-methylaminopropylidene-10,10-dimethyl-9,10-dihydroanthracene crystallize out, melting at 198–200 degrees centigrade.

Example 2.—9-gamma-N-piperidinopropylidene-10,10-dimethyl-9,10-dihydroanthracene and its hydrochloride When Example 1 is carried out using 250 milliliters of piperidine instead of methylamine 73 grams of 9-gamma-N-piperidinopropylidene-10,10-dimethyl - 9,10 - dihydroanthracene is obtained, melting at 266–269 degrees centigrade.

Example 3.—9 - gamma-(N'-beta-hydroxyethyl-N-piperazinylpropylidene)-10,10 - dimethyl - 9,10-dihydroanthracene and its dihydrochloride When Example 1 is carried out using 250 grams of beta-hydroxyethylpiperazine instead of methylamine, the dihydrochloride of 9-gamma-(N'-beta-hydroxyethyl-N-piperazinylpropylidene)-10,10 - dimethyl - 9,10-dihydroanthracene is obtained, melting at 270–272 degrees centigrade. Yield 82 grams.

Example 4.—5-(gamma - methylaminopropylidene)-dibenzo-[a,d]cyclohepta[1,4]diene and its hydrochloride When Example 1 is carried out using 145 grams of the methiodide of 5-(gamma-dimethylaminopropylidene)-dibenzo[a,d]cyclohepta[1,4]diene melting at 186–189 degrees centigrade and extending the time of heating to 72 hours the hydrochloride of 5-(gamma-methylaminopropylidene)-dibenzo[a,d]cyclohepta[1,4]diene is obtained, melting at 214–215 degrees centigrade. Yield 48 grams.

Example 5.—5 - (gamma - morpholinopropylidene)-dibenzo[a,d]cyclohepta[1,4]diene and its hydrochloride When Example 4 is carried out using 250 milliliters of morpholine instead of methylamine the hydrochloride of 5-(gamma - morpholinopropylidene)-dibenzo[a,d]cyclohepta[1,4]diene is obtained melting at 230.5–232.5 degrees centigrade.

Example 6.—Other 5-(gamma-secondary amino or tertiary aminopropylidene) - dibenzo[a,d]cyclohepta[1,4]dienes and their hydrochlorides When Example 4 is carried out using ethylamine, isopropylamine and diethylamine respectively instead of methylamine, the hydrochlorides of 5-(gamma-ethylaminopropylidene)-dibenzo[a,d]cyclohepta[1,4]diene (M.P. 262–264 degrees centigrade), 5-(gamma-isopropylaminopropylidene) - dibenzo[a,d]cyclohepta[1,4]diene (M.P. 239–141 degrees centigrade) and 5-(gamma-diethylaminopropylidene)-dibenzo[a,d]cyclohepta[1,4]diene (M.P. 168–169 degrees centigrade) are obtained.

Example 7.—3 - chloro - 5-(gamma-methylaminopropylidene)-dibenzo[a,d]cyclohepta[1,4]diene and its hydrochloride When Example 1 is carried out using the methiodide of 3 - chloro - 5 - (gamma-dimethylaminopropylidene)-dibenzo[a,d]cyclohepta[1,4]diene the hydrochloride of 3-chloro-5-(gamma - methylaminopropylidene) - dibenzo [a,d]cyclohepta[1,4]diene (M.P. 260–262 degrees centigrade) is obtained.

Example 8.—5 - (gamma - methylaminopropylidene)-dibenzo[a,d]cycloheptatriene and its hydrochloride When Example 1 is carried out using 145 grams of the methiodide of 5-(gamma-dimethylaminopropylidene)-dibenzo[a,d]cycloheptatriene melting at 245–247 degrees centigrade the hydrochloride of 5-(gamma-methylaminopropylidene)-dibenzo[a,d]cycloheptatriene is obtained, melting at 214–217 degrees centigrade.

I claim:
1. Method of producing compounds having the structural formula:

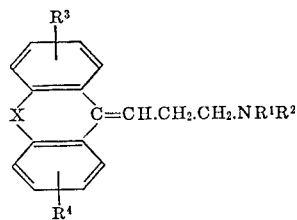

(I)

wherein X is a radical selected from the group consisting of —$CH_2$—$CH_2$—, —CH=CH— and —$C(CH_3)_2$—, ·$NR^1R^2$ is a radical selected from the group consisting of mono-(lower alkyl)amino, di-(lower alkyl) amino, a saturated five-membered amine and a saturated six-membered heterocyclic amine, and R³ and R⁴ are each selected from the group consisting of hydrogen, halogen, a lower-alkyl group, a lower alkoxy group, and non-toxic pharmaceutically acceptable acid addition salts thereof, comprising, mixing and reacting together a quaternary ammonium compound of the formula:

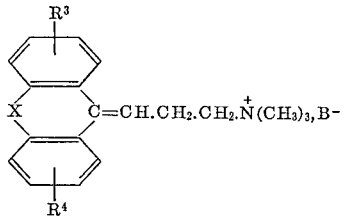

wherein X, R³ and R⁴ are as defined above and B⁻ is an inorganic anion with an amine of the formula HNR¹R², wherein ·NR¹R² is as defined above, and isolating the resulting compound of the Formula I.

2. Method according to claim 1, comprising employing the amine HNR¹R² in sufficient quantity to serve as a solvent for the reaction.

3. Method according to claim 1, comprising carrying out the reaction at a temperature of at least 100 degrees centigrade.

4. Method according to claim 1, comprising carrying out the reaction in the presence of water.

5. Dimethyldihydroanthracene derivative selected from the group consisting of (1) a compound of the formula:

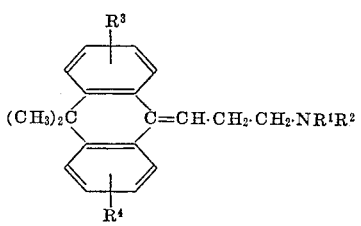

wherein ·NR¹R² is selected from the group consisting of mono-(lower alkyl)amino, N-piperazinyl, and N'-hydroxy-lower alkyl-N-piperazinyl and R³ and R⁴ are each selected from the group consisting of hydrogen, halogen, a lower-alkyl group, and a lower-alkoxy group, and (2) non-toxic acid addition salts thereof.

6. 9 - gamma-methylaminopropylidene-10,10-dimethyl-9,10-dihydroanthracene.

7. A non-toxic acid addition salt of 9-gamma-methylaminopropylidene-10,10 - dimethyl - 9,10-dihydroanthracene.

8. The hydrochloride of 9-gamma-methylaminopropylidene-10,10-dimethyl-9,10-dihydroanthracene.

9. 9 - gamma - (N'-beta-hydroxyethyl-N-piperazinyl-propylidene)-10,10-dimethyl-9,10-dihydroanthracene.

10. A non-toxic acid addition salt of 9-gamma-(N'-beta - hydroxyethyl-N-piperazinylpropylidene)-10,10 - dimethyl-9,10-dihydroanthracene.

11. The hydrochloride of 9-gamma-(N'-beta-hydroxyethyl-N-piperazinylpropylidene) - 10,10 - dimethyl-9,10-dihydroanthracene.

12. Method according to claim 2, comprising carrying out the reaction at a temperature of at least 100 degrees centigrade.

13. Method according to claim 2, comprising carrying out the reaction in the presence of water.

14. Method according to claim 3, comprising carrying out the reaction in the presence of water.

15. A compound of the formula:

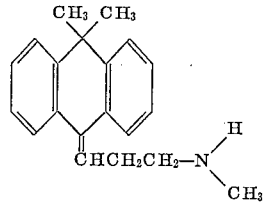

16. A compound of the formula:

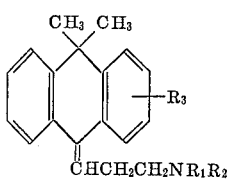

wherein NR₁R₂ is monoloweralkylamino, piperazinyl or N'-hydroxy-loweralkylpiperazinyl and R₃ is hydrogen, halogen, lower alkyl or lower alkoxy.

References Cited

UNITED STATES PATENTS

| | | | |
|---|---|---|---|
| 2,404,219 | 7/1946 | Cusic | 260—293 |
| 3,073,847 | 1/1963 | Doebel et al. | 260—240 XR |
| 2,676,971 | 4/1954 | Cusic et al. | 260—268 XR |
| 2,996,503 | 8/1961 | Sprague et al. | |
| 3,100,207 | 8/1963 | Zirkle. | |
| 3,113,137 | 12/1963 | Schacran. | |
| 3,116,291 | 12/1963 | Peterson et al. | 260—240 |
| 3,149,103 | 9/1964 | Peterson et al. | 260—240 |
| 2,971,887 | 2/1961 | Johnson | 167—65 |
| 2,997,422 | 8/1961 | Tedeschi | 167—65 |

FOREIGN PATENTS

| | | |
|---|---|---|
| 99,624 | 5/1960 | Czechoslovakia. |

OTHER REFERENCES

Mychajlyszyn et al.: Collection of Czech. Chem. Communications, vol. 24, p. 3955 (1959).

Bonvicino et al.: J. Org. Chem., vol. 26, pp. 2383–2392 (1961).

Stach et al.: Monatschefte fur Chemie, vol. 93, pp. 896–904 (Sept. 20, 1962).

Houben-Weyl: Methoden der Organischen Chemie, fourth ed., vol. 14 (Stickstoffverbindungen II), pp. 248, 250, Georg Thieme Verlag, Stuttgart, Germany (1957).

Curtin et al.: J. Am. Chem. Soc., vol. 81, pp. 4719–4728 (1959).

HENRY R. JILES, *Primary Examiner.*

U.S. Cl. X.R.

260—351, 999